(12) United States Patent
Ekman

(10) Patent No.: US 9,739,484 B2
(45) Date of Patent: Aug. 22, 2017

(54) METHOD FOR COMBUSTION OF A LOW-GRADE FUEL

(71) Applicant: LINDE AKTIENGESELLSCHAFT, München (DE)

(72) Inventor: Tomas Ekman, Saltsjö-Boo (SE)

(73) Assignee: Linde Aktiengesellschaft, Munich (DE)

( * ) Notice: Subject to any disclaimer, the term of this patent is extended or adjusted under 35 U.S.C. 154(b) by 141 days.

(21) Appl. No.: 14/778,743

(22) PCT Filed: Jan. 14, 2014

(86) PCT No.: PCT/EP2014/000072
§ 371 (c)(1),
(2) Date: Sep. 21, 2015

(87) PCT Pub. No.: WO2014/154309
PCT Pub. Date: Oct. 2, 2014

(65) Prior Publication Data
US 2016/0047544 A1    Feb. 18, 2016

(30) Foreign Application Priority Data
Mar. 28, 2013 (EP) .................................. 13001643

(51) Int. Cl.
*F23G 7/06*         (2006.01)

(52) U.S. Cl.
CPC ............. *F23G 7/066* (2013.01); *F23G 7/06* (2013.01); *F23G 2200/00* (2013.01); *F23G 2207/30* (2013.01); *F23G 2209/14* (2013.01); *F23G 2900/55001* (2013.01); *F23K 2900/01041* (2013.01)

(58) Field of Classification Search
CPC ......................................................... F23G 7/06
USPC ......................................... 431/215; 126/91 A
See application file for complete search history.

(56) References Cited

U.S. PATENT DOCUMENTS

| | | | |
|---|---|---|---|
| 4,306,858 A * | 12/1981 | Simon | F23D 14/66 126/91 A |
| 9,004,910 B2 | 4/2015 | Ekman et al. | |
| 2009/0011290 A1* | 1/2009 | Chudnovsky | B01J 19/0013 429/423 |

(Continued)

FOREIGN PATENT DOCUMENTS

| | | |
|---|---|---|
| JP | S57198913 A | 12/1982 |
| SE | 533731 C2 | 8/2011 |

OTHER PUBLICATIONS

International Search Report for PCT/EP2014/000072, dated Feb. 17, 2014, Authorized Officer: Jerome Christen, 3 Pages.

(Continued)

*Primary Examiner* — Avinash Savani
(74) *Attorney, Agent, or Firm* — Joshua L. Cohen

(57) ABSTRACT

A method includes combustion products from combustion of fuel with oxidant brought first through a first heat exchanging step (150;201), in which thermal energy is transferred from the combustion products to the fuel which is thereby preheated, and the cooled combustion products thereafter are brought through a second heat exchanging step (151; 203), in which thermal energy is transferred from the cooled combustion products to the oxidant which is thereby also preheated. A related system for preheating the fuel and oxidant is also provided.

16 Claims, 1 Drawing Sheet

(56) References Cited

U.S. PATENT DOCUMENTS

Figure 1:
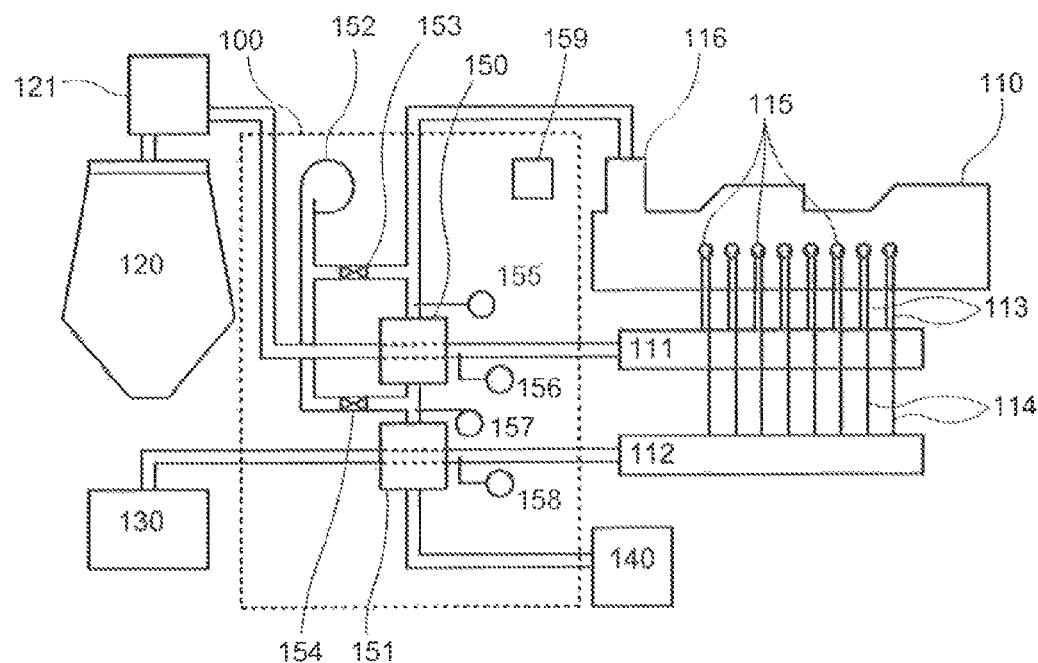

2010/0047727 A1 2/2010 Chever et al.
2011/0059410 A1 3/2011 Glynn

OTHER PUBLICATIONS

Written Opinion of the International Searching Authority for PCT/EP2014/000072, dated Feb. 17, 2014, Authorized Officer: Jerome Christen, 4 pages.

* cited by examiner

METHOD FOR COMBUSTION OF A LOW-GRADE FUEL

The present invention relates to a method and a preheating system for combustion of a low grade fuel using an industrial burner. More particularly, the invention relates to such combustion for hearing of an industrial furnace.

In plants in which industrial furnaces are used to produce steel and other metals, various low-grade, gaseous fuels are often produced as byproducts. One example is so called top gas from blast furnaces, which are used for steel production. Another example is off-gas from converters. Such low-grade fuels typically contain a mixture of substances that may comprise for instance hydrocarbons, nitrogen gas, oxygen gas, hydrogen gas, carbon monoxide, carbon dioxide and water vapor. Because the energy density in such fuels is often limited, they are conventionally used for low temperature processes such as heating or power production. Alternatively, they may be mixed into fuels that are more energy dense. They may also be burned off into the atmosphere to no use.

Since such low-grade fuels are often produced in abundance in for instance steelworks, and are therefore comparatively cheap, it would be desirable to be able to use them to a larger extent also in high temperature processes, suet as in heating furnaces for steel materials, where normally more high-grade fuels are used.

Moreover, using a low-grade fuel which already exists as a byproduct from another industrial process instead of using a conventional, externally supplied, fossil fuel will decrease the carbon footprint of a plant.

In order to be able to use low-grade fuels in such applications, it has for instance been proposed, in Swedish patent 533,731C2, to switch the supplies for fuel and oxidant in an existing air burner, and to at the same time use a low-grade fuel.

In the US patent publication no. US 2010/0047727A1, a method is described for making use of residual heat from a heating furnace by using part of the combustion products to preheat the fuel, while another share of the combustion products is used to preheat one oxidant.

Japan patent application JPS57198913(A), on the other hand, describes a burner exploiting the thermal energy in the combustion produces by preheating low-grade fuel and/or air in a heat exchanger.

The present invention offers a supplement or alternative to the above suggestions for making the exploitation of low-grade fuel possible in heating furnaces. Moreover, the invention solves the problem of preheating an oxidant using combustion products, also when the combustion products leaving the combustion zone are very not. Conventionally, such preheating has been problematic, since hot combustion products constitute a security hazard if the preheating equipment breaks and they come into direct contact with the oxidant.

Hence, the invention relates to a method for combustion of a fuel using at least one industrial burner, which burner is fed with a low-grade, gaseous fuel with a Lower Heating Value (LHV) of 8 MJ/Nm3 or less and an oxidant, which method is characterised in that the combustion products from the combustion of the fuel with the oxidant are brought firstly through a first heat exchanging step in which thermal energy is transferred from the combustion products to the fuel which is thereby preheated, and the thus cooled combustion products thereafter are brought through a second heat exchanging step in which thermal energy is transferred from the cooled combustion products to the oxidant which is thereby also preheated.

The invention also relates to a system for preheating a low-grade, gaseous fuel with a Lower Heating Value (LHV) of 8 MJ/Nm3 or less and an oxidant and feeding said preheated low-grade fuel and said preheated oxidant to at least one industrial burner using the fuel which is combusted with the oxidant to produce hot combustion products, which system is characterised in that the system comprises a first heat exchanging device arranged to transfer heat from the hot combustion products to the fuel which is thereby preheated, and the system also comprises a second heat exchanger arranged to transfer thermal energy from the combustion products which have been cooled in the first heat exchanging step to the oxidant which is thereby also preheated.

Figure 2:
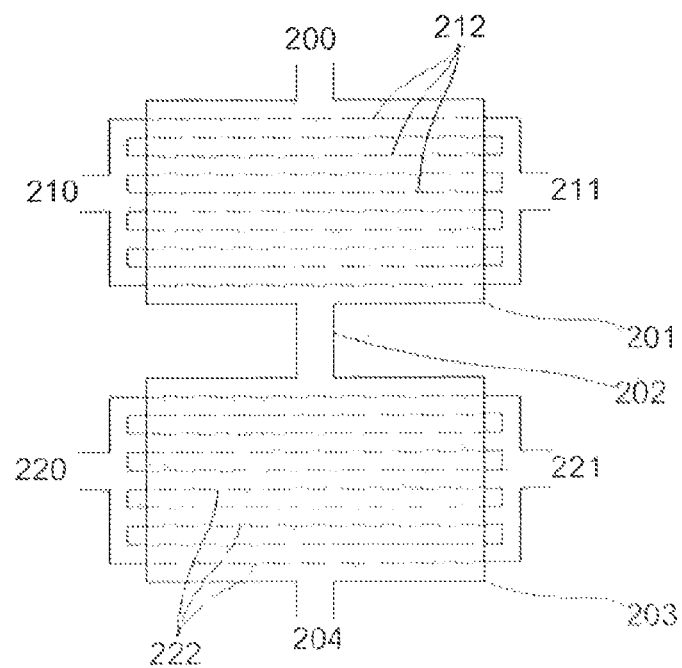

In the following, the invention will be described in detail, with reference to exemplifying embodiments of the invention and to the enclosed drawings, wherein:

FIG. 1 is a simplified view of a preheating system according to the present invention; and FIG. 2 is a simplified view of a heat exchanger arrangement according to the invention.

FIG. 1 illustrates an industrial furnace 110 operated according to the present invention using a preheating system 100, also according to the invention. Preferably, the industrial furnace 110 is a heating furnace for a metal material, preferably steel, and is preferably arranged to maintain heating temperatures in the furnace atmosphere of at least about 1000° C., such as for reannealing of steel products, more preferably at least about 1200° C., for instance for reheating of steel products before hot rolling.

In order to heat the furnace 110, at least one industrial burner 115 is used, which is or are mounted in a furnace wall. Each burner 115 comprises at least one each of a supply opening for fuel and a supply opening for oxidant.

The oxidant may be air, but it is preferred that the oxygen contents of the oxidant are higher than those for air. Hence, according to a preferred embodiment, the oxidant comprises at least 50% by weight oxygen, more preferably at least 85% by weight oxygen. Even more preferably, the oxidant comprises at least 95% oxygen, such as industrially pure oxygen. Combustion with an oxidant comprising high levels of oxygen in combination with a low-grade fuel yields an especially cost-efficient heating. Also, preheating of the present type makes it possible to use combustion products to preheat even these types of high oxygen oxidant without this resulting in any major safety hazards.

According to the invention, the burner or burners 115 are driven with a gaseous, low-grade fuel, such as top gas from a blast furnace.

Table 1 is a comparison of typical rates of different constituents between, on the one hand, a medium-grade fuel such as coke oven gas and, on the other hand, a low-grade fuel, such as top gas from a blast furnace and off-gas from a converter. All values are given in percentage by volume.

TABLE 1

|  | $N_2$ | $O_2$ | $H_2$ | CO | $CO_2$ | $CH_4$ | $C_mH_n$ | $H_2O$ |
|---|---|---|---|---|---|---|---|---|
| Coke oven gas | 3.5 | 0.55 | 60 | 7.5 | 2.35 | 23.5 | 2.4 | 0.2 |
| Top gas | 52.5 | 0.55 | 2.3 | 23.5 | 20 | — | — | 1.15 |
| Converter gas | 17.2 | 0.1 | 2.5 | 64.5 | 15.6 | — | — | 0.1 |

Table 2 is a comparison of Lower Heating Values (LHV) for coke oven gas, top gas from a blast furnace and off-gas from a converter.

TABLE 2

|  | LHV (MJ/Nm³) | LHV (MJ/kg) |
|---|---|---|
| Coke oven gas | 17.9 | 34 |
| Top gas | 3.2 | 2.4 |
| Converter gas | 8.0 | 6.0 |

According to the invention, the burner or burners 115 are driven with a gaseous fuel the LHV of which is equal to or lower than 8 MJ/Nm³. However, it is preferred that the gaseous fuel has an LHV of no more than 6 MJ/Nm³, more preferably no more than 4 MJ/Nm³. The fuel may comprise a certain addition of another, more high-grade fuel, as long as the LHV of the total mixture does not exceed the said limits in terms of MJ/Nm³. In particular, lower LHVs work better in combination with oxidants comprising high levels of oxygen. A preferred fuel example is a mixture of top gas and converter off-gas, which both originate from a local steel making installation comprising a blast furnace and a converter. For cost reasons, it is preferred not to mix in any high-grade fuels before combustion, in particular not to mix in any fuels that themselves have LHVs of more than 8 MJ/Nm³, such as is the case for instance for coke oven gas.

The burner or burners 115 are provided, via conduits 113, with low-grade fuel from a fuel supply means 111, which receives the low-grade fuel from a source of such low-grade fuel. In FIG. 1, an exemplifying, simplified blast furnace 120 is shown, from which top gas is brought, via a gas cleaning step 121 and a pipe work, to the supply means 111. However, it is realized that the low-grade duel source may be a source of converter off-gas or any other suitable source of low-grade fuel as exemplified above.

According to a preferred embodiment, the low-grade fuel comprises at least 50% by weight top gas originating from the operation of the blast furnace 120. Moreover, it is preferred that blast furnace 120 is locally arranged in the same industrial plant as the furnace 110, and consequently also the turner or burners 115. This way, the plant as a whole can be made more energy efficient.

Oxidant is supplied to the turner or burners 115, via conduits 114, from an oxidant supply means 112, to which oxidant is supplied from an oxidant source 130, such as a conventional source of industrially pure oxygen or a conventional means for oxygen enriching air.

Both the fuel and the oxidant pass the preheating system 100 before reaching means 111 and 112, respectively.

The gaseous combustion products from the combustion, by burner or burners 115 and in furnace 110, of the fuel with the oxidant, exit from the furnace 110 via flue 116, and are then led in a pipe work as shown in FIG. 1.

According to the invention, the said combustion products are brought firstly through a first heat exchanging step 150, in which thermal energy is transferred from the said combustion products to the fuel, which is thereby preheated. Thereafter, the thus cooled combustion products are brought through a second heat exchanging step 151, in which thermal energy is transferred from the cooled combustion products to the oxidant, which is thereby also preheated. In other words, the low-grade fuel and the oxidant are preheated one after the other, in serves. This means that the oxidant is preheated using the thermal energy of the same combustion products that preheat the low-grade fuel, but after the combustion products have already been cooled to some extent by preheating the low-grade fuel. This way, the thermal energy content of the combustion products from the furnace 110 can be exploited more fully, while at the same time minimizing any risks of explosion or the like relating to the preheating of oxidant, especially in case a high oxygen oxidant is used.

After having passed steps 150 and 151, the combustion products are preferably brought to a cleaning or processing step 140 arranged to take care of the cooled combustion products.

Of course, during the passage of the combustion products through steps 150, 151, the combustion products never come into direct physical contact with either the low-grade fuel or the oxidant to be preheated. Instead, only a thermal contact is established.

According to a preferred embodiment, the second heat exchanging step comprises a metal heat exchanger of recuperator type, in other words a heat exchanger which is not a regenerator, but one in which the thermal energy is transferred from one medium to another in a manner which is direct rather than indirect, in other words without any intermediate heating of some other medium prior to the sequential heating of the low-grade fuel or the oxidant. Preferred heat exchangers used in steps 150, 151 are counter-flow or cross-flow heat exchangers.

Specifically, it is preferred to use metal heat exchangers, in which a metal separating means is used to keep the compassion products at all times separated from the low-grade fuel and the oxidant, respectively. Preferred metal materials for such means comprise stainless steels.

In particular, it is preferred that, in the second heat exchanging step 151, the oxidant is conveyed in one or several metal pipes through a chamber, through which chamber combustion products are arranged to flow, which pipes are arranged to separate the oxidant from the combustion products and to convey heat from the combustion products in the chamber to the oxidant in the said pipes.

This is illustrated in FIG. 2, in which a first heat exchanging step 201, corresponding to the first heat exchanging step 150 as shown FIG. 1 and comprising an entry 200 for not combustion products, is connected in series via a conduit 202 to a second heat exchanging step 203, corresponding to the second heat exchanging step 151 in FIG. 1 and comprising an exit 204 for cooled combustion products. Through the first heat exchanging step 201, heat exchanging pipes 212 run inside a chamber inside step 201, from an entry 210 for low-grade fuel to an exit 211 for preheated low-grade fuel. Similarly, in step 203, heat exchanging pipes 222 run inside a chamber inside step 203, from an entry 220 for oxidant to an exit 221 for preheated oxidant.

It is preferred that the metal material of separating means arranged to keep the oxidant separated from the combustion gases, that is pipes 222 in FIG. 2, is made of a metal material which is more acid resistant than the metal material of corresponding separating means arranged to at all times keep the low-grade fuel separated from the combustion gases, that is pipes 212 in FIG. 2. Examples of suitable materials for the said separation means in the second heat exchanging step comprise sufficiently acid resistant stainless steel types.

It is furthermore preferred that only said separating means of heat exchanging step 151, hence in FIG. 2 only pipes 222, are made from such acid resistant stainless steel, and that the rest of the heat exchanging step 150, 151 is constructed from other, less acid resistant stainless steels and/or non-metal material.

In FIG. 1 is furthermore illustrated an ambient air supply device 152, for instance in the form of a conventional fan with a suitable pipe work, preferably working in collaboration with and being controlled by, a control device 159 which is in communication (for instance wired communication) with the air supply device 152.

The device 152 is arranged to supply ambient air to the flow of combustion products upstream of the first heat exchanging step 150, in order to cool the combustion products before entering into the step 150. The supply takes place via a control valve 153, which may be controlled by control device 159 to effect the flow control.

Moreover, the device 152 is arranged to control the temperature of the combustion products flowing into the step 150 based upon a measured temperature of the combustion products upstream of the step 150 and/or a measured temperature of the low-grade fuel downstream of the step 150. Such temperatures are measured using suitable temperature sensors 155 and 150, respectively.

According to a supplementary or alternative embodiment, the same or a different ambient air supply device 152 (only one such device is shown in FIG. 1) is arranged to supply ambient air to the flow of combustion products downstream of the first heat exchanging step 150 but upstream of the second heat exchanging step 151, preferably via a control valve 154 which may also be controlled by control device 159, in order to cool the combustion products before entering into the step 151. In this case, the device 152 is arranged to control the temperature of the combustion products flowing into the second heat exchanging step based upon a measured temperature of the combustion products upstream of she step 151 and/or a measured temperature of the oxidant downstream of the step 151. Such temperatures are measured using suitable temperature sensors 157 and 158, respectively.

According to a preferred embodiment, the control device 159 is arranged to read temperature inputs from at least two, preferably at least three, of the temperature sensors 155-158, respectively arranged to measure temperatures of combustion gases upstream of step 150 and between steps 150, 151; temperature of low-grade fuel downstream of step 150; and temperature of oxidant downstream of step 151. Based upon these measurement values, the control device 159 is then arranged to control the supply device 152 to supply a sufficient amount of ambient air to the combustion products upstream of the first heat exchanging step 150 in order to keep the temperature of the combustion products flowing into the second step 151 at or below a predetermined highest allowable temperature. Such control may be based upon a suitable control algorithm, for instance taking into account empirically and/or theoretically determined parameters regarding cooling of the combustion products when flowing through the first heat exchanging step 150. The control algorithm may also be based upon for instance the flow of low-grade fuel through step 150.

The ambient air may be of about room temperature, but is at least cooler than the combustion gases with which it is mixed.

As described above, the combustion products may have a temperature of about 1000° C. when leaving the flue 116. According to a preferred embodiment, the temperature of the combustion products at the entry into the first heat exchanging step 150, after possible mixing with ambient air, is at least 800° C. Similarly, the temperature of the combustion products at the entry into the second heat exchanging step 151, after cooling in step 150 and possible additional mixing with ambient air, is not more than 400° C. This will result in efficient preheating but still minimize security hazards.

By first preheating the low-grade fuel and thereafter, using the already partly cooled-off combustion products, preheating the oxidant, a number of advantages are achieved.

Firstly, in many applications a larger share of the energy contents of the hot combustion products can be transferred to the fuel and oxidant than what is possible when only heat exchanging thermal energy in one single step to the fuel and/or to the oxidant.

Secondly, the density of the hot combustion products decreases when they are cooled by the fuel in the first heat exchanging step 150, which results in that the second heat exchanging step 151, transferring thermal energy to the oxidant, can be designed with lower capacity. This, in turn, results in a more cost-efficient installation.

Thirdly, it is possible to preheat even a high oxygen oxidant without running into safety risks.

Above, preferred embodiments have been described. However, it is apparent to the skilled person that many modifications may be made to the described embodiments without departing from the basic idea of the invention.

For example, it is realized that the heat exchanging step 150, 201 may be of the corresponding or a different type than the heat exchanging step 151, 203, as long as the principles herein are honored.

It is also realized that burners 115, supplied with preheated low-grade fuel and preheated oxidant, may be supplemented by other burners also heating the same furnace 110, such as conventional oxyfuel burners. However, it is preferred that the burners 115 constitute the only heat source of the furnace 110.

Thus, the invention shall not be limited to the described embodiments, but may be varied within the scope of the enclosed claims.

What is claimed is:

1. A method for combustion of a fuel using at least one industrial burner (115) fed with a low grade, gaseous fuel having at least 50% by weight top gas from a blast furnace (121) and a Lower Heating Value (LHV) of not greater than 8 MJ/Nm$^3$ and an oxidant, comprising:
   originating the low grade, gaseous fuel from operating the blast furnace arranged in a same industrial plant as the at least one industrial burner;
   providing combustion products from the combustion of the fuel with the oxidant through a first heat exchanging step (150;201) for transferring thermal energy from the combustion products to the fuel thereby preheating said fuel; and
   providing thereafter cooled combustion products through a second heat exchanging step (151;203) for transferring thermal energy from the cooled combustion products to the oxidant thereby preheating said oxidant.

2. The method of claim 1, further comprising heating an industrial furnace (110) from a combustion reaction between the oxidant and the low grade, gaseous fuel.

3. The method of claim 1, wherein the oxidant comprises at least 85% by weight oxygen.

4. The method of the claim 1, wherein the second heat exchanging step comprises a metal heat exchanger of recuperator type.

5. The method of claim 4, wherein the second heat exchanging step comprises:
   conveying the oxidant in at least one metal pipe (222) through a chamber;

flowing the combustion products through the chamber; and arranging the at least one metal pipe for separating the oxidant from the combustion products and for conveying heat from the combustion products in the chamber to the oxidant in the at least one metal pipe.

6. The method of claim 1, wherein a first temperature of the combustion products at an entry to the first heat exchanging step is at least 800° C., and a second temperature of said combustion products at another entry to the second heat exchanging step is less than 400° C.

7. The method of claim 1, further comprising:
supplying ambient air from a first ambient air supply device (152) to a flow of the combustion products upstream of the first heat exchanging step for cooling said combustion products before entering the first heat exchanging step;
measuring at least one of a first temperature of the combustion products upstream of the first heat exchanging step, and a second temperature of the fuel downstream of the first heat exchanging step; and
controlling a temperature of the combustion products flowing into the first heat exchanging step with the first air supply device based upon at least one of the first and second temperatures.

8. The method of claim 7, further comprising:
supplying ambient air from a second ambient air supply device (152) to the flow of the combustion products downstream of the first heat exchanging step and upstream of the second heat exchanging step for cooling the combustion products before entering the second heat exchanging step;
measuring at least one of a third temperature of the combustion products upstream of the second heat exchanging step, and a fourth temperature of the oxidant downstream of the second heat exchanging step; and
controlling a temperature of the combustion products flowing into the second heat exchanging step with the second air supply device based upon at least one of the third and fourth temperatures.

9. A system (100) for preheating a low grade, gaseous fuel having a Lower Heating Value (LHV) of not more than 8 MJ/Nm$^3$ and an oxidant for being fed to at least one industrial burner (115) for producing hot combustion products, comprising:
a first heat exchanging device (150;201) in first heat exchange contact with the hot combustion products and the fuel for preheating said fuel; and
a second heat exchanging device (157;203) in second heat exchange contact with combustion products cooled by the first heat exchange contact, and with the oxidant for preheating said oxidant, the second heat exchanging device comprising a recuperator-type metal heat exchanger comprising:
a chamber through which the combustion products flow,
at least one metal pipe (222) extending through the chamber and through which the oxidant flow separated from the combustion products,
wherein heat is conveyed from the combustion products in the chamber to the oxidant in the at least one metal pipe.

10. The system of claim 9, wherein the oxidant comprises at least 85% by weight oxygen.

11. The system of claim 9, further comprising:
an ambient air supply device (152) arranged to supply a flow of ambient air to the combustion products upstream and downstream of the first heat exchanging device, and upstream of the second heat exchanging device;
at least one temperature sensor (155,156,157,158) arranged to measure temperature of at least one of the combustion products upstream of the first heat exchanging device, downstream of the first heat exchanging device; and the temperature of the fuel downstream of the first heat exchanging device, and the temperature of the oxidant downstream of the second heat exchanging device; and
a controller in communication with the ambient air supply device and at least one temperature sensor for controlling the supply of the ambient air flow based upon data measured from the at least one temperature sensor.

12. A method for combustion of a fuel using at least one industrial burner (115) fed with a low grade, gaseous fuel having a Lower Heating Value (LHV) of not greater than 8 MJ/Nm$^3$ and an oxidant, comprising:
providing combustion products from the combustion of the fuel with the oxidant through a first heat exchanging step (150;201) for transferring thermal energy from the combustion products to the fuel thereby preheating said fuel; and
providing thereafter cooled combustion products through a recuperator type metal heat exchanger of a second heat exchanging step (151;203) for transferring thermal energy from the cooled combustion products to the oxidant thereby preheating said oxidant, the second heat exchanging step comprising:
conveying the oxidant in at least one metal pipe (222) through a chamber,
flowing the combustion products through the chamber, and
arranging the at least one metal pipe for separating the oxidant from the combustion products and for conveying heat from the combustion products in the chamber to the oxidant in the at least one metal pipe.

13. A method for combustion of a fuel using at least one industrial burner (115) fed with a low grade, gaseous fuel having a Lower Heating Value (LHV) of not greater than 8 MJ/Nm$^3$ and an oxidant, comprising:
providing combustion products from the combustion of the fuel with the oxidant through a first heat exchanging step (150;201) for transferring thermal energy from the combustion products to the fuel thereby preheating said fuel; wherein a first temperature of the combustion products at an entry to the first heat exchanging step is at least 800° C.; and
providing thereafter cooled combustion products through a second heat exchanging step (151;203) for transferring thermal energy from the cooled combustion products to the oxidant thereby preheating said oxidant, wherein a second temperature of said combustion products at another entry to the second heat exchanging step is less than 400° C.

14. A method for combustion of a fuel using at least one industrial burner (115) fed with a low grade, gaseous fuel having a Lower Heating Value (LHV) of not greater than 8 MJ/Nm$^3$ and an oxidant, comprising:
providing combustion products from the combustion of the fuel with the oxidant through a first heat exchanging step (150;201) for transferring thermal energy from the combustion products to the fuel thereby preheating said fuel;

providing thereafter cooled combustion products through a second heat exchanging step (151;203) for transferring thermal energy from the cooled combustion products to the oxidant thereby preheating said oxidant;

supplying ambient air from a first ambient air supply device (152) to a flow of the combustion products upstream of the first heat exchanging step for cooling said combustion products before entering the first heat exchanging step;

measuring at least one of a first temperature of the combustion products upstream of the first heat exchanging step, and a second temperature of the fuel downstream of the first heat exchanging step; and controlling a temperature of the combustion products flowing into the first heat exchanging step with the first air supply device based upon at least one of the first and second temperatures.

15. The method of claim 14, further comprising:

supplying ambient air from a second ambient air supply device (152) to the flow of the combustion products downstream of the first heat exchanging step and upstream of the second heat exchanging step for cooling the combustion products before entering the second heat exchanging step;

measuring at least one of a third temperature of the combustion products upstream of the second heat exchanging step, and a fourth temperature of the oxidant downstream of the second heat exchanging step; and controlling a temperature of the combustion products flowing into the second heat exchanging step with the second air supply device based upon at least one of the third and fourth temperatures.

16. A system (100) for preheating a low grade, gaseous fuel having a Lower Heating Value (LHV) of not more than 8 MJ/Nm$^3$ and an oxidant for being fed to at least one industrial burner (115) for producing hot combustion products, comprising:

a first heat exchanging device (150;201) in first heat exchange contact with the hot combustion products and the fuel for preheating said fuel;

a second heat exchanging device (157;203) in second heat exchange contact with combustion products cooled by the first heat exchange contact, and with the oxidant for preheating said oxidant;

an ambient air supply device (152) arranged to supply a flow of ambient air to the combustion products upstream and downstream of the first heat exchanging device, and upstream of the second heat exchanging device;

at least one temperature sensor (155,156,157,158) arranged to measure temperature of at least one of the combustion products upstream of the first heat exchanging device, downstream of the first heat exchanging device; and the temperature of the fuel downstream of the first heat exchanging device, and the temperature of the oxidant downstream of the second heat exchanging device; and a controller in communication with the ambient air supply device and at least one temperature sensor for controlling the supply of the ambient air flow based upon data measured from the at least one temperature sensor.

* * * * *